(No Model.)
A. BORNHOLDT.
SEPARATING THE CONSTITUENTS OF LIQUID BODIES.
No. 489,363. Patented Jan. 3, 1893.
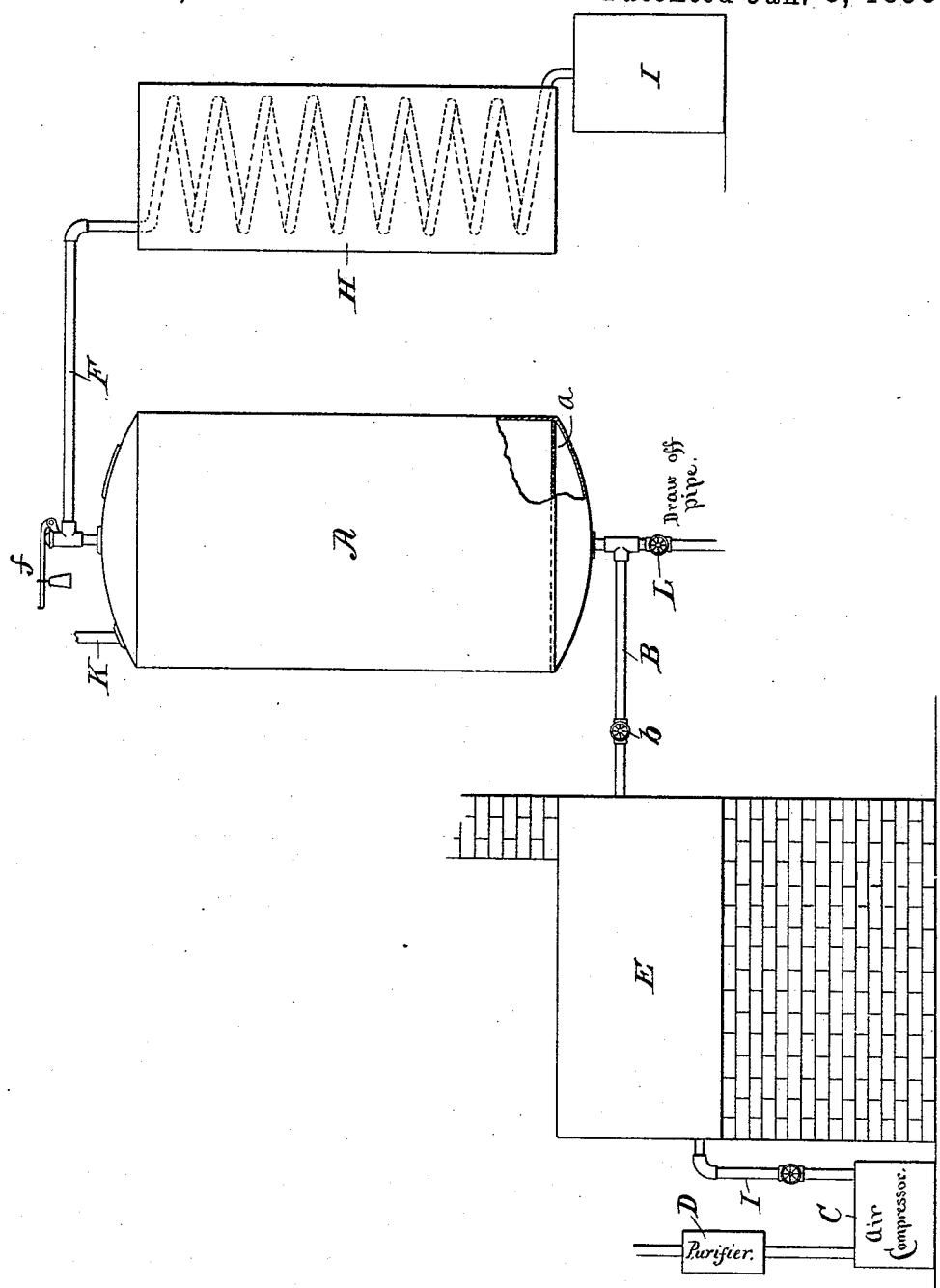
Attest:
Geo. T. Smallwood,
J Matthew Tilley
Inventor:
Adolph Bornholdt
by Pollok & Mauro
his attorneys

United States Patent Office.

ADOLPH BORNHOLDT, OF BROOKLYN, NEW YORK, ASSIGNOR TO THE NATIONAL VACUUM DRYING AND AIR DISTILLING COMPANY, OF SAME PLACE.

SEPARATING THE CONSTITUENTS OF LIQUID BODIES.

SPECIFICATION forming part of Letters Patent No. 489,363, dated January 3, 1893.

Application filed March 2, 1892. Serial No. 423,482. (No model.)

*To all whom it may concern:*

Be it known that I, ADOLPH BORNHOLDT, a resident of Brooklyn, in the county of Kings and State of New York, have invented a new and useful Improvement in Processes of Separating the Constituents of Liquid Bodies, which improvement is fully set forth in the following specification.

This invention relates broadly to the art of treating liquid bodies for the purpose of separating the constituents of different specific gravities.

The ordinary process of distilling, as is well known, is carried on by subjecting the liquid to be distilled to the action of heat sufficient to vaporize the volatile constituents thereof, and subsequently collecting and condensing these vapors. Sometimes the heat is applied by a current of steam which is caused to pass through the liquid, thereby agitating the latter and facilitating the evolution and liberation of the gases. It is also common in distilling to apply a suction or exhaust pump to the still for the purpose of creating a partial vacuum therein, and producing a more rapid discharge of the vapors as they are formed. I have found however, that when a vacuum pump is so used, the rarefaction of the atmosphere in the still causes a lowering of the temperature and consequent waste of heat.

The present invention consists in effecting a distillation or separation of the constituents of liquid bodies by the action of air under high pressure. The pressure to be used will vary according to the character of the liquid to be treated, but the principle of the invention, and the mode of practicing the same will be understood by taking as an example the distillation of alcohol. In the ordinary processes it requires a temperature of about 150° Fahrenheit to distill alcohol. According to my invention the crude spirit is placed in a suitable tank or vessel adapted to withstand high internal pressure and which is provided with an adjustable valve controlling the outlet or escape pipe, which valve can be set to maintain the desired pressure in the tank. Air is then forced in up to a pressure of say three hundred pounds. The liquid may be warmed by preheating the air, or by direct heat of a furnace or otherwise, to a temperature of about 100° Fahrenheit. Under these conditions, the air passing through the liquid, becomes saturated or impregnated with the vapors thereof, acting thereon like a solvent. As the pressure increases, the air passes more slowly through the liquid body, remaining for a considerable time in contact therewith, and thus becoming completely charged or saturated. Thus the separation of the lighter from the heavier constituents of the liquid body is effected at a temperature much lower than that ordinarily required, and economy of fuel is one result. It also follows that condensation of the vapors is accomplished more easily and expeditiously than in ordinary processes. When, by raising the pressure above the limit to which the valve is adjusted, the air commingled or saturated with vapors, is allowed to escape into the condensing vessel, the sudden expansion causes a fall of temperature which aids the condensation of the vapors to such an extent that but little water or other cooling medium for condensing is required.

The invention is not, of course, limited to any particular degrees of temperature or pressure, these being variable within wide limits, and must be regulated to suit the particular liquid under treatment.

In the accompanying drawing, which forms part of this specification, I have illustrated by way of example, an arrangement of apparatus that may be employed in practicing the invention, but it will be understood that the latter is not limited to any particular form of apparatus.

In the drawing (which is a diagrammatic view) A represents a distilling tank or vessel, so constructed as to be able to withstand a high internal pressure. In the bottom thereof is a perforated plate $a$ and beneath this is the air admission pipe B provided with a cock or valve $b$. The use of the perforated plate $a$, is preferable but not essential. C represents an air forcing pump or compressor of any suitable construction, and D represents a purifier through which the air is drawn into the pump. The purifier is used when, for any reason, it is desirable to employ pure air.

The air passes from the pump into a storage tank E, which is placed above a brick furnace or other heater of suitable construction, whereby the air may be heated to any desired temperature. The vapor discharge pipe F is provided with a valve $f$, of known construction and adapted to maintain any desired pressure in the tank or vessel A. The pipe F leads to a condensing chamber H which as shown is connected with a receiving tank I. The tank or vessel A is provided with an inlet pipe K for liquids, and with a discharge pipe L, for drawing off the residues.

In operation the vessel A is filled to a suitable height, say to about half its capacity, with the liquid to be separated, and the valve $f$ is set to maintain the desired pressure in the vessel A. The air pump is now put in operation and air is forced into vessel E and thence to the vessel A, passing through the liquid therein, diffusion being aided by the perforated plate $a$. In passing through the liquid the air particles become impregnated with the vapors thereof, and as the pressure in the tank increases, the contact of the air with the liquid is more and more prolonged. Finally, when the pressure exceeds the point to which valve $f$ is adjusted, there is a discharge of air and vapors through pipe F into the condensing chamber H. Here the pressure of the air and vapors being suddenly relaxed, there is a consequent fall of temperature, so that condensation of the vapors, and the separation thereof from the air, is readily effected.

Among the advantages of the process it may be mentioned, that the mild heat of the air has no tendency to burn the liquid under treatment, and that a purer distillate and greater quantity is obtained than in processes where a coil or direct heat from under-fire is employed.

The degree of heat to be employed will, as already stated, depend upon the character of the liquid under treatment. I have found that in distilling alcohol with a pressure of from two hundred and eighty to three hundred pounds a temperature of 100° Fahrenheit is sufficient.

The process may be usefully employed in separating the constituents of bodies which are solid or semi-solid at ordinary temperatures and become liquefied by heat.

This process of separation in a medium of high pressure is to be distinguished from the known processes of removing volatile matters from liquid bodies by forcing currents of air, steam, or the like, through the same.

Having now fully described my said invention, what I claim and desire to secure by Letters-Patent, is:—

1. The described process of treating liquid bodies to separate the volatile constituents thereof by subjecting the same in a closed vessel to the action of air under high pressure, and afterward releasing the same in a condensing chamber of low pressure, substantially as set forth.

2. The described process of treating liquid bodies to separate the volatile constituents thereof by forcing through the same, while in a closed vessel, currents of air under high pressure, until the pressure in said vessel reaches a predetermined limit, then drawing off the commingled air and vapors into a chamber of low pressure and then condensing the vapors, as set forth.

3. The described process of treating liquid bodies to separate the constituents thereof, by forcing through the same currents of warmed or heated air under high pressure and drawing off the air and vapors into a condensing chamber of low pressure, substantially as described.

In testimony whereof I have signed this specification in the presence of two subscribing witnesses.

ADOLPH BORNHOLDT.

Witnesses:
H. N. MEEKER,
H. PERRY BUCK.